United States Patent [19]

MacKenzie

[11] 4,209,178
[45] Jun. 24, 1980

[54] LUBRICANT SEAL

[75] Inventor: Ronald MacKenzie, Newport Beach, Calif.

[73] Assignee: Philco-Ford Corporation, Blue Bell, Pa.

[21] Appl. No.: 851,313

[22] Filed: Nov. 14, 1977

Related U.S. Application Data

[63] Continuation of Ser. No. 540,070, Jan. 10, 1975, abandoned.

[51] Int. Cl.² .................................................. F16J 15/40
[52] U.S. Cl. ...................................... 277/133; 277/135
[58] Field of Search ................... 277/133, 180, 67, 68, 277/135

[56] References Cited

U.S. PATENT DOCUMENTS

| 2,003,000 | 5/1935 | Kelpe | 277/133 |
|---|---|---|---|
| 2,051,304 | 8/1936 | Leister et al. | 277/133 |
| 2,403,687 | 7/1946 | Shafer | 277/133 |
| 2,419,884 | 4/1947 | Cooper | 277/133 |
| 2,590,422 | 3/1952 | Large | 277/133 |
| 3,561,793 | 2/1971 | Rode | 277/180 |

Primary Examiner—Robert I. Smith
Attorney, Agent, or Firm—Keith L. Zerschling; John J. Roethel

[57] ABSTRACT

A lubricant seal for an oil lubricated ball bearing journalling a shaft within the cavity of a stationary housing. The lubricant seal comprises an annular rigid oil sling affixed to the shaft within the cavity. The oil slinger is formed of an oil absorbing material adapted at low or nonrotational speed of the shaft to absorb excess oil within the housing cavity and at high speed to centrifuge oil into the bearing.

3 Claims, 1 Drawing Figure

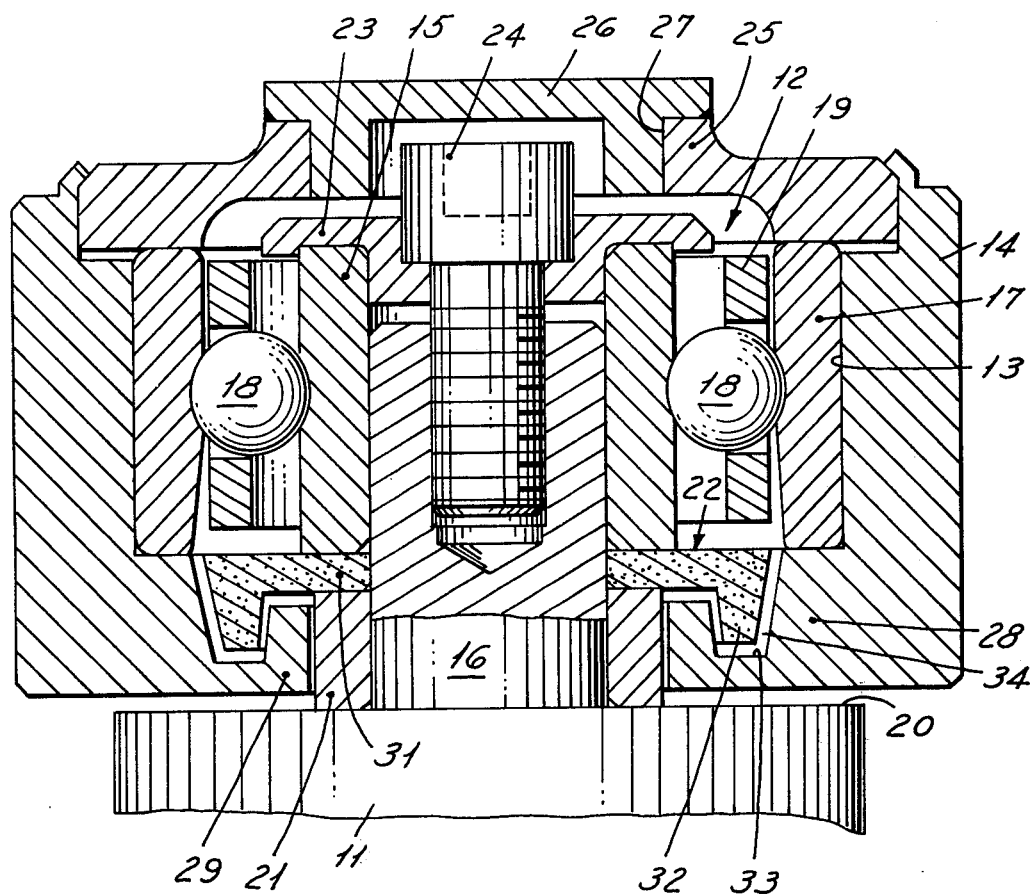

LUBRICANT SEAL

This is a continuation of application Ser. No. 540,070, filed Jan. 10, 1975 and now abandoned.

BACKGROUND OF THE INVENTION

Conventional methods of sealing shaft bearings against lubricant loss utilize flexible seals, metal retainers or "O" rings which require material contact. If the seal is held stationary in the bearing housing, the material or frictional contact is with the rotating shaft journalled in the bearing. If the seal is mounted on the shaft, the frictional contact is with the housing supporting the bearing journalling the shaft. For low wear characteristics and efficient operation, high speed motors or mechanism utilizing ball bearings to journal the shaft require extremely low friction drag coefficients. The ideal design is one in which the seal is carried by the shaft and has no material contact with the wall of the housing cavity in which the ball bearing supporting the shaft is mounted.

It is an object of the present invention to provide a lubricant seal having no material contact with the stationary housing and which is capable of absorbing excess oil from the housing cavity when the system is at rest to prevent leakage past the shaft. It is a further object that the lubricant seal be capable at high speeds of centrifuging oil into the rapidly rotating inner race of the bearing to lubricate the balls of the bearing.

SUMMARY OF THE INVENTION

The present invention relates to a lubricant seal for an oil lubricated ball bearing journalling a shaft within the cavity of a stationary housing. The lubricant seal comprises an annular rigid oil slinger affixed to the shaft within the cavity. The oil slinger is formed of an oil absorbent material adapted at low or nonrotational speed of the shaft to absorb excess oil within the housing cavity to prevent leakage past the shaft and at high speed to centrifuge oil into the bearing.

Preferably, the oil slinger and an adjacent wall of the cavity have coacting noncontacting portions forming a labyrinth further inhibiting passage of oil to the exterior of the cavity. Further, preferably, the oil absorbent material has a porosity of 30%-40% by volume and may be of metal or plastic.

DESCRIPTION OF THE DRAWING

Further features and advantages of the present invention will be made more apparent as this description proceeds, reference being had to the accompanying drawing wherein the single FIGURE illustrates in cross section a typical embodiment of the present invention.

DESCRIPTION OF THE INVENTION

Referring to the drawing, one end of a shaft 11 is rotatably supported by a conventional ball bearing 12 within the cylindrical bore or cavity 13 of a stationary housing 14. The ball bearing 12 comprises an inner race 15 that receives an extension end 16 of the shaft 11. The outer race 17 of the bearing 12 fits within the cylindrical bore or cavity 13 and the inner and outer races are operatively separated by conventional balls 18, the balls being positioned by a ball cage 19.

The bearing 12 is positioned on the shaft extension 16 in spaced relation to the shoulder 20 of the main shaft 11 by a spacer 21 and an annular oil slinger 22, both the spacer 21 and slinger 22 being rotatable with the shaft 11. The spacer 21, slinger 22 and ball bearing 12 are retained on the shaft extension 16 by a retainer plate 23 secured by a center bolt 24.

At its outer end the cylindrical bore 13 of the housing 14 is closed by an outer bearing retainer 25 having an oil cap 26 plugging a central aperture 27 in the retainer. At its opposite or inner end, the end receiving the shaft 16, the housing 14 has a radially extending end wall 28 terminating in an axially inwardly extending ring or cylindrical flange 29. The internal diameter of the flange is minutely larger than the outside diameter of the spacer 21.

The oil slinger 22 has an annular body portion 31 terminating in an axially outwardly extending flange 32 having an interfitting relation with an annular groove 33 in the housing end wall 28 and cylindrical flange 29. This interfitting relationship provides a clearance slot 34 which follows a labyrinth path from the housing cavity 13 to the atmosphere.

As shown in the drawing, the peripheral surface of the oil slinger flange 32 is an inclined plane of increasing radial dimension from its end adjacent the apertured end wall 28 of the housing 14 toward the end adjacent the bearing means whereby during high speed rotation of the slinger oil movement along the inclined plane is toward the bearing means.

The foregoing describes the physical characteristics of a typical shaft and bearing assembly embodying the present invention. It will be understood that these characteristics may be subject to variation. Of interest, however, in connection with the present invention is the material composition of the oil slinger 22.

The oil slinger 22 is more than just a rotating disc adapted to pick up oil from a reservoir portion of the housing cavity and to centrifuge the oil on a shaft or bearing as disclosed in U.S. Pat. No. 1,701,707 issued Feb. 12, 1929 to G. Eveno for a "Lubricating Bearing for Journal Boxes". It is also more than a simple distributor of oil admitted to the housing cavity as disclosed in U.S. Pat. No. 3,532,399 issued Oct. 6, 1970 to P. W. Gray for a "Labyrinth Sling Seal". The slinger 22 is a rigid annular member which is oil absorbent and is therefore capable of acting as an oil storage member when the shaft and bearing are at rest or rotating at a low speed, thus preventing leakage of the oil between the shaft and the housing.

At high speeds, even on the order or 85,000 rpm, the oil contained within the slinger 22 is centrifuged into the ball bearing to provide a suitable quantity of lubricant on the moving parts. As the unit slows down or comes to rest, the excess oil in the housing cavity, gravitates toward the sling 22 and is absorbed by the latter before it can work its way out through the coacting flanges and grooves through the slot 34 past the shaft 11.

Preferably, the oil absorber material used for the oil slinger 22 is a sintered bronze material that is 30%-40% porous by volume. The material has a bronze consistency of 92% copper±3% and 8% tin±3%. The density of the material is 5.8 to 6.3 grams per cubic centimeter and the ultimate tensile strength is on the order of 7000 psi.

Another material that could be utilized is a porous nylon material having the same oil absorption characteristic as the sintered bronze material, i.e. 30%-40%.

It should be understood that the FIGURE of the drawing illustrates the condition in which the oil slinger 22 is most effective. That is, beneath the upper bearing of a vertically supported shaft. If the shaft 11 would be considered as horizontally mounted, the oil slinger 22 would pick excess oil from whatever side of the cavity would be beneath the shaft extension 16. If the mechanism utilizing the shaft 11 is operable in an inverted position relative to that shown, the oil sling 22 would probably be non-functional since the excess oil would gather at the bearing retainer 25 end. It should be understood that this end of the housing 14 would be sealed by suitable rubber seals between the housing 14, bearing retainer 25 and oil cap 26.

Further, if the shaft 11 projected through the housing 14 such as might occur if the shaft was centrally supported as well as at its ends, an oil slinger 22 could be utilized at both sides of the bearing 12 to prevent excess oil flow from either end of the housing.

It is to be understood this invention is not limited to the exact construction illustrated and described above, but that various changes and modifications may be made without departing from the spirit and scope of the invention as defined by the following claims:

I claim:

1. In combination,
   a housing having end walls and a cylindrical side wall forming a cavity in the housing,
   the cavity being substantially sealed against oil leakage except for an aperture in one end wall,
   a shaft projecting through the aperture into the cavity,
   oil lubricated bearing means mounted within the cavity rotatably journalling the shaft,
   a preinjected quantity of oil entrapped within the housing,
   and a lubricant seal comprising a rigid annular oil slinger formed of an oil absorbent material,
   the oil slinger being affixed to the shaft within the cavity between the bearing means and the apertured end wall,
   the oil slinger having on its side facing the bearing means a radially extending surface portion unimpededly exposed to the bearing means and also having its peripheral surface in close non-contact running relation to a portion of the cylindrical side wall adjacent the apertured end wall,
   the apertured end wall and the oil slinger on its side facing the apertured end wall having radially and axially overlapping portions having a close running fit to each other forming a labyrinth inhibiting passage of oil to the outside of the housing,
   the oil slinger being rotatable with the shaft and at low or non-rotatable speed being capable of absorbing oil from the cavity to prevent leakage through the labyrinth to the exterior of the housing and at high speed to centrifugally restore the absorbed oil to the cavity for deposition on the bearing means.

2. In combination, according to claim 1, in which:
   the oil absorbent slinger has a porosity of 30%–40% of its volume and is capable of absorbing a proportionate volume of the oil in the cavity.

3. In combination, according to claim 1, in which:
   the peripheral surface of the oil slinger is an inclined plane of increasing radial dimension from its end adjacent the apertured end wall toward the end adjacent the bearing means whereby during high speed rotation of the slinger oil movement along the inclined plane is toward the bearing means.

* * * * *